United States Patent

Bungter et al.

[11] Patent Number: 5,906,266
[45] Date of Patent: May 25, 1999

[54] TRANSPORT APPARATUS FOR TEXTILE PACKAGES

[75] Inventors: Helmut Bungter, Viersen; Stefan Bungter, Mönchengladbach, both of Germany

[73] Assignee: W. Schlafhorst AG & Co., Moenchengladbach, Germany

[21] Appl. No.: 08/908,392

[22] Filed: Aug. 7, 1997

[30] Foreign Application Priority Data

Aug. 8, 1996 [DE] Germany .............. 196 31 987

[51] Int. Cl.⁶ .................. B65G 25/02; B65G 47/31
[52] U.S. Cl. .................. 198/774.1; 198/468.6; 198/461.1; 198/570; 242/35.5 A
[58] Field of Search .................. 198/570, 774.1, 198/468.6, 461.1, 35.5 A

[56] References Cited

U.S. PATENT DOCUMENTS

| | | | |
|---|---|---|---|
| 3,850,287 | 11/1974 | Petros | 198/774.1 |
| 4,050,571 | 9/1977 | Kushingham | 198/774.1 |
| 4,783,889 | 11/1988 | Hayashi | 198/774.1 |
| 4,875,572 | 10/1989 | Kiriake . | |

FOREIGN PATENT DOCUMENTS

| | | |
|---|---|---|
| 0 325 991 B1 | 1/1989 | European Pat. Off. . |
| 30 16 158 C2 | 11/1981 | Germany . |
| 253 797 A1 | 2/1988 | Germany . |
| 37 31 497 A1 | 4/1988 | Germany . |
| 40 31 511 A1 | 4/1992 | Germany . |
| 42 29 112 C2 | 3/1994 | Germany . |
| 43 05 916 A1 | 9/1994 | Germany . |
| 44 28 247 A1 | 2/1996 | Germany . |

Primary Examiner—William E. Terrell
Assistant Examiner—Mark Deuble
Attorney, Agent, or Firm—Kennedy Covington Lobdell & Hickman, LLP

[57] ABSTRACT

An apparatus for transporting textile packages in a transport direction along an elongate package supporting surface comprises a guide track extending beneath the elongate supporting surface, an elongated thrust element slidable on the guide track, and an elongated lift element superposed on the thrust element for elevational movement toward and away therefrom via connecting pivot rods. A stop device on the thrust element limits the elevational movement of the lift element between a lowered position disposed beneath the elongate supporting surface and a raised position disposed at a higher elevation than the elongate supporting surface for displacing textile packages off the elongate supporting surface. A drive actuates elevational movement of the lift element and displaces the lift and thrust elements as a unit along the guide track when the lift element is in the raised position for transporting the textile packages displaced by the raised lift element.

16 Claims, 7 Drawing Sheets

TRANSPORT APPARATUS FOR TEXTILE PACKAGES

FIELD OF THE INVENTION

The present invention relates to a transport apparatus for textile packages and, more particularly, to such an apparatus equipped with elongated thrust elements, which are seated to be displaceable in the package transport direction, and with a drive for displacing the thrust elements.

BACKGROUND OF THE INVENTION

As used herein in connection with the present invention, the term textile packages is intended to encompass and is to be understood to include any package of textile yarn, strand or other textile material wound, contained or otherwise collected in a packaged form such as, without limitation, spinning pots, cheeses, speed frame bobbins, cops, canned sliver, or the like.

Transport apparatus and devices for yarn cheeses, for example, have been known for a long time in connection with textile machines producing cheeses, such as open-end rotor spinning machines or winding machines which produce cheese packages from yarn bobbins. These textile machines either have two conveyor belts disposed in a central disposition such as in the case of open-end rotor spinning machines or are equipped with a bobbin transport belt disposed in an off center disposition such as in the case of cheese winding machines.

The cheeses produced on the winding installations of such textile machines are customarily transferred to the transport apparatus or devices running the length of the machine by automatically operating service units, which may be so-called cheese changers in the case of bobbin winding machines or possibly piecing carriages with changing devices in the case of open-end spinning machines, and the cheeses are conveyed by the transport apparatus or devices to a bobbin removal apparatus disposed at the end of the machine. These bobbin removal apparatus, for example palletizing devices or the like, transfer the cheeses to bobbin transport carriages or other downstream-located transport devices.

In a cheese transfer from the winding devices of the individual work stations of a winding machine to the transport device or apparatus running the machine length, such as represented for example in European Patent Publication EP 0 325 991 B1, it must be assured that the cheese to be transferred does not collide with cheeses which are already being transported on the conveyor belt of the transport apparatus or devices. Thus, in the course of the cheese transfer by means of the cheese changer or the piecing carriage, it must be assured that at the time of the transfer of a cheese the space on the conveyor belt located behind the respective winding device is unoccupied.

Various belt clearing strategies are known to prevent the collision of cheeses during this transfer. For example, it can be provided to first successively load a stopped conveyor belt with cheeses and subsequently to unload the filled or nearly filled conveyor belt at a palletizing device preferably disposed at the end of the machine. However, this method is disadvantageous in that it is necessary to make the drives of the transport device of relatively large size because of the not inconsiderable loading imposed by the supported cheeses, and the conveyor belt is stretched so greatly that additional positioning and control devices are required for detecting the respective exact positioning of the cheeses on the conveyor belt. This method furthermore leads to a reduction in the useful effects, since fresh cheeses can not be exchanged in the area of the winding stations during unloading.

Another clearing strategy immediately transports every finished cheese via the conveyor belt to the palletizing device into a bobbin reception position in which the cheese can be grasped by the palletizer. With this method, the transport device is stopped for loading and unloading every cheese, which in the end results in a "stop and go" operation and considerably stresses not only the transport device but also the delicate cheeses.

It is further known in connection with the transport of spinning pots to employ installations with transport elements which are lifted for the pot transport operation and which subsequently move the spinning pots to initiate transport by a longitudinal displacement, such as described in German Patent Publications DE 40 31 511 A1 and DE 43 05 916 A1.

Another transport device for textile packages is disclosed in German Patent Publication DE 44 28 247 A1, utilizing two parallel elongated thrust elements with interspersed ratchet dogs. In this apparatus, the thrust elements are seated and coupled by means of a coupling device such that a relative movement takes place between the thrust elements when one of the thrust elements is acted upon, and in turn results in the ratchet dogs being pivoted inwardly. The direction of pivoting outwardly of the ratchet dogs, and therefore the transport direction of the pot transport device, can be directionally set by means of appropriate blocking means acting on the coupling device. However, a continuous transport operation in which the spinning pots are stowed is not possible with the device described in German Patent Publication DE 44 28 247 A1.

OBJECT AND SUMMARY OF THE INVENTION

Based on the foregoing, it is accordingly a basic object of the present invention to improve such transport apparatus for textile packages of the general type equipped with driven thrust elements seated displaceably in the package transport direction.

Basically, the present invention is adapted to essentially any textile package handling machine, installation or arrangement wherein an elongate surface is provided for supporting textile packages in alignment with one another and defines a transport direction for the packages. Briefly summarized, the present invention provides an apparatus for transporting the textile packages along the elongate supporting surface comprising a guide track extending in the transport direction beneath the elongate supporting surface, an elongated thrust element supported on the guide track for displacement in the transport direction, an elongated lift element disposed in essentially superposed disposition with respect to the thrust element, and means such as pivot rods connecting the lift element to the thrust element for elevational movement toward and away from the thrust element in essentially parallel relation thereto. A stop device or similar means is provided on the thrust element for limiting the elevational movement of the lift element relative to the thrust element between a lowered position of the lift element disposed beneath the elongate supporting surface and a raised position of the lift element disposed at a higher elevation than the elongate supporting surface wherein the packages are displaced by the lift element off the elongate supporting surface to be supported on the lift element. A drive is connected to the lift element for actuating elevational movement of the lift element between the lowered position and the raised position and for displacing the lift element and the thrust element as a unit longitudinally along the guide track in the transport direction when the lift element is in the raised position for transporting the packages supported on the raised lift element.

The transport apparatus in accordance with the present invention constitutes a rugged construction which makes a careful and positionally correct transport of textile packages possible in a simple manner. In particular, in connection with the disposal of delicate cheeses which are transferred to the transport device in the area of the work stations of a textile machine for producing cheeses, the present invention assures that collisions with cheeses already on the transport apparatus are avoided.

One preferred embodiment in accordance with the present invention is particularly adapted for use in textile machines which comprise a plurality of aligned work stations arranged in spaced relation. In such embodiment, the drive comprises a thrust piston having an operating stroke corresponding to the spacing between the work stations of the textile machine. This arrangement assures that when needed, i.e. for transferring a finished cheese to the conveyor belt or for receiving a cheese from a palletizing device, the present transport device can be positioned without problems and with sufficient exactness that perfect handling of the respective cheeses is assured, whereby it is possible in this case to omit additional sensor and control means.

The working stroke of the thrust piston is advantageously arranged to take into consideration the largest separation distance occurring between the work positions of the respective textile machine. Thus, in textile machines wherein the work stations are arranged in a plurality of sections each having a plurality of spaced work stations, the operating stroke of the thrust piston is preferably matched to the spacing between adjacentmost work stations in adjoining work station sections of the textile machine.

The present apparatus for transporting textile packages in a textile package handling arrangement may be embodied with the elongate supporting surface and the lift element particularly configured for receiving and transporting textile yarn cheeses, with the lift element having a cheese receiving surface adapted for supporting a plurality of cheeses. The structural design of the present transport device results in a particularly careful handling of the cheeses, since they are only slightly lifted during transport and rest with a relatively large surface area on the supporting surfaces of the arrangement and the lift element during transport as well as during their intermediate storage.

Another embodiment of a transport apparatus is advantageously configured particularly for the transport of spinning pots. In such an embodiment, the means for limiting elevational movement of the lift element may comprise switchable stop elements arranged at a spacing from one another on the thrust element to be selectively engageable with cooperative catches preferably formed as spaced recesses on the lift element on the lift element for selective switching between opposing transport directions. The change in the transport direction thusly enabled by the switchable stops makes it possible, when necessary, to perform the supply of the textile machine with filled spinning pots and thereafter the removal of the emptied spinning pots on the same transport track of the transport apparatus. This transport apparatus is furthermore capable of stowing spinning pots in both directions.

As a rule, a textile machine producing cheeses has several machine sections arranged next to each other, each such section in turn having a plurality of work stations, which generally results in separation spaces at the machine section boundaries between neighboring work stations different from the spacing between work stations arranged within the same machine section. These separation differences can lead to problems when moving the cheeses away. The problems occur both in the area of the individual work stations and in downstream located devices, for example at a palletizing device. By means of an advantageous embodiment of the present invention, such separation differences in the area of the machine section boundaries are compensated in an novel manner and the known problems are thereby avoided. Specifically, this embodiment utilizes a second thrust element, a second lift element, and a second connecting means supporting the lift element superposed on the thrust element for elevational movement relative thereto between the lowered position and the raised position. The first and second thrust and lift elements are arranged in spaced alignment with one another and the drive includes an elongate push rod directly fixed to the first lift element and a lost motion connection indirectly connecting the push rod to the second lift element. The lost motion connection preferably comprises a connecting element fixed to the second lift element and receiving the push rod slidably therethrough and an engagement dog fixed on the push rod at a spacing from the connecting element in the lowered position of the second lift element selected to limit the sliding distance of the push rod within the connecting element to correspond to the spacing between adjacentmost work stations in adjoining work station sections. Thus, this embodiment automatically bridges the spacing differences in the area of the sectional boundaries between adjoining work station sections, so that additional positioning or control devices for the exact, positionally correct placement of the cheese do not become necessary.

In embodiments wherein the elongate supporting surface and the lift element are configured for receiving and transporting textile yarn spinning pots, it is further preferred that the lift element include a continuous spinning pot supporting surface configured for supporting a plurality of spinning pots laterally adjacent or otherwise aligned with one another to permit such spinning pots to be accumulated thereon while awaiting transport operation of the present apparatus.

Further details of the present invention will be recognized and understood from the exemplary embodiments represented in the accompanying drawings and more fully described below.

DETAILED DESCRIPTION OF THE PREFERRED EMBODIMENTS

Figure 1:
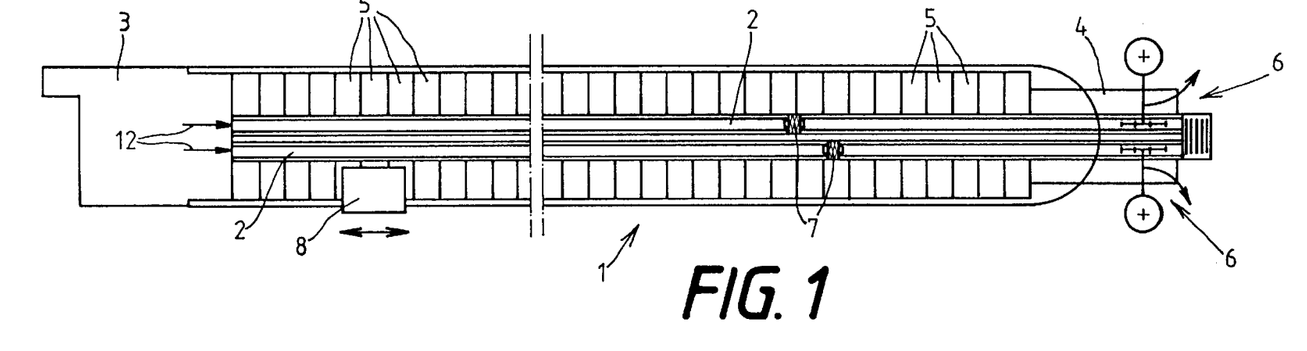
FIG. 1 is a top plan view of a textile machine for producing cheeses, equipped with a schematically represented package transport apparatus in accordance with one preferred embodiment of the present invention.

Referring now to the accompanying drawings and initially to FIG. 1, a transport apparatus 2 for textile packages in accordance with the present invention is shown in a top view in an embodiment thereof in a textile machine 1 which produces yarn cheeses, for example an open-end rotor spinning machine. This textile machine basically has an elongate framework comprising a drive frame 3 at one lengthwise end, an end frame 4 at the opposite lengthwise end and a plurality of work stations 5, arranged side by side one another in two parallel rows between the frames 3 and 4. As in the illustrated embodiment, the work stations 5 for example have open-end spinning units and an associated yarn winding device (not shown) which winds the spun yarn into the form of a so-called cheese. The work stations 5 are supplied by an automatically operating service unit 8.

The cheeses 7 produced in the work stations 5 are transported away therefrom by means of the transport apparatus 2 disposed lengthwise along the machine between the two rows of work stations 5 and extending outwardly, for example, to a palletizing device 6 arranged at one machine end, which transfers the cheeses 7 to downstream connected conveying devices (not shown).

Figure 2:
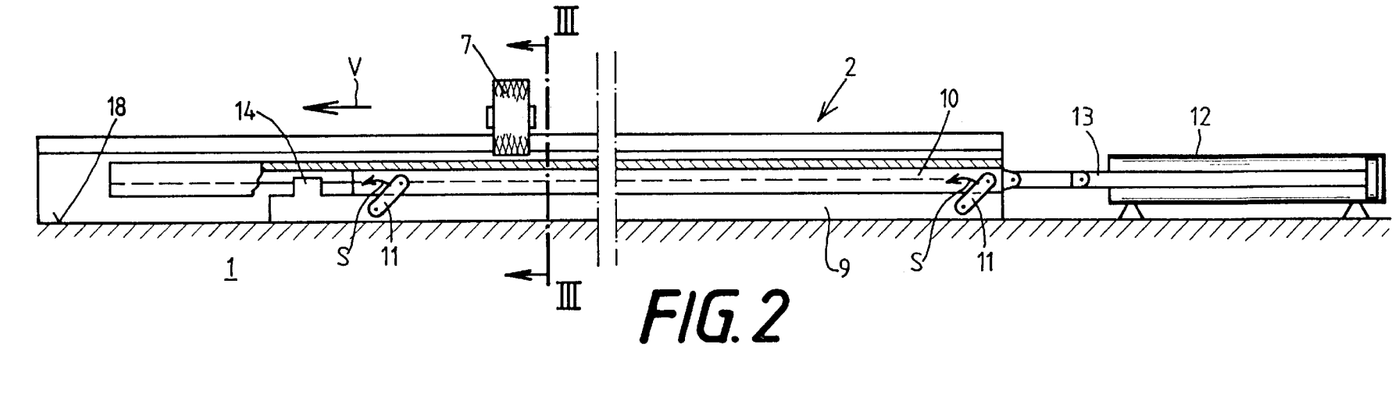
FIG. 2 is a side elevational view, partially in lengthwise cross section, of the transport apparatus in accordance with the embodiment of FIG. 1.

The transport device 2 is shown in greater detail in a lateral partially sectioned view in FIG. 2, and is preferably comprised of at least one lower thrust element 9 and at least one upper lift element 10 connected via guide rods 11 so they are relatively pivotable to a limited extent. The thrust element 9 slides on a guide track 18, whereby a relatively large amount of friction is created between the thrust element 9 and the guide track 18 which can be increased, for example, by a braking device or the like.

A thrust piston housing 12 is mounted on the framework of the machine 1 and slidably supports a reciprocable piston having an extending piston rod 13 which is connected to the lift element 10 for displacing the movable elements 9, 10 of the transport apparatus 2 in the transport direction V when the piston rod 13 is extended outwardly. In the course of such outward displacement of the piston rod 13, the friction existing between the thrust element 9 and the guide track 18 initially resists sliding movement of the thrust element 9 causing the lift element 10 to first be pivoted around the guide rods 11 in the direction of the arrow S until the lift element 10 or the guide rods 11 come into contact with a detent 14. In the course of the continued extension of the piston rod 13, the friction between the guide track 18 and the thrust element 9 is overcome, whereupon the thrust element 9 is displaced in the transport direction V.

Figure 3:
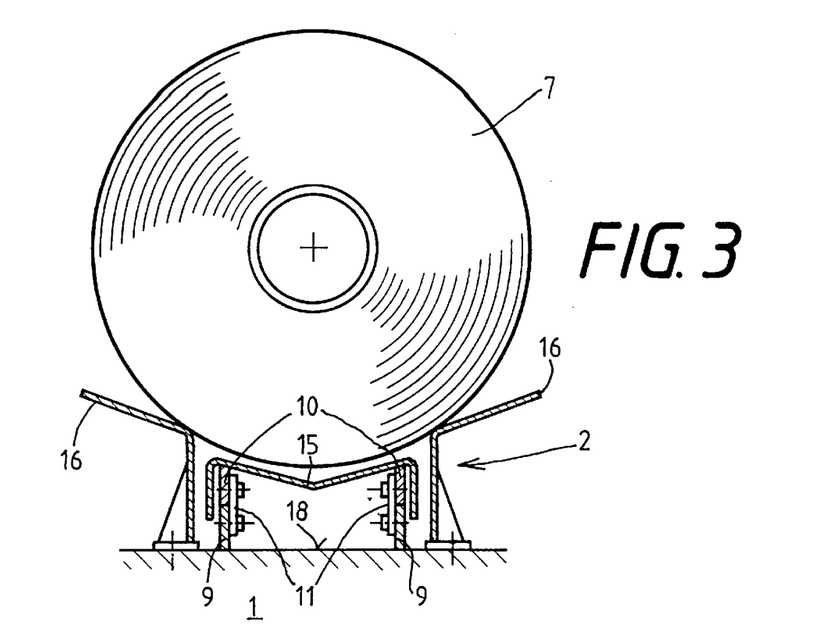
FIG. 3 is a transverse cross section of the transport apparatus of FIGS. 1 and 2 taken along section line III—III of FIG. 2, with the transport apparatus shown in a lowered position.
Figure 4:
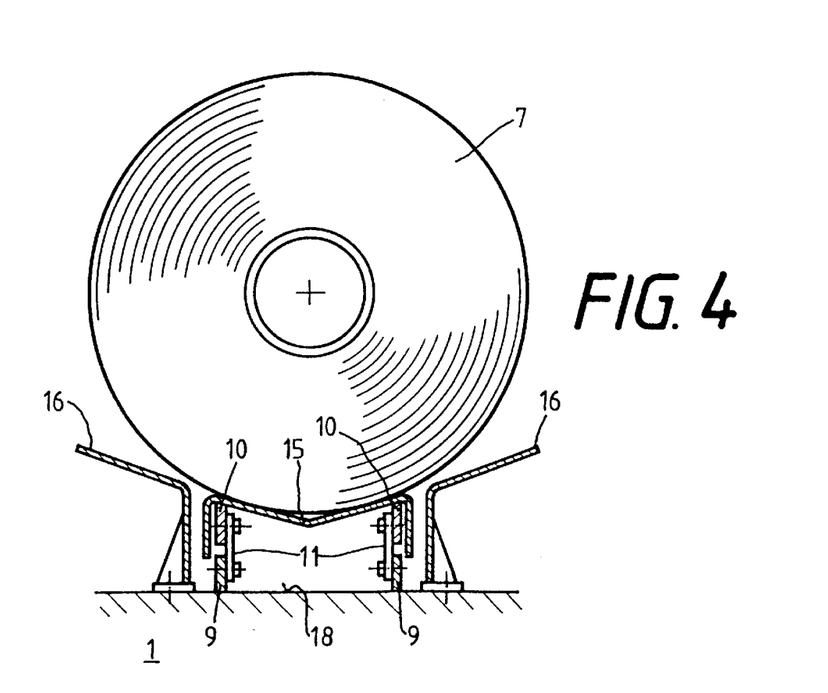
FIG. 4 is another transverse cross sectional view similar to FIG. 3 also taken through the transport apparatus along the section line III—III in FIG. 2, with the transport apparatus shown in its transport position.

As best seen in FIGS. 3 and 4, the machine 1 includes a lengthwise extending stationary support 16 defined by two spaced angle members extending along opposite sides of the transport apparatus 2 to receive and support full cheeses, such as represented by the cheese 7 in FIG. 3, discharged from the work stations 5. The lift element 11 supports an elongate V-shaped cheese receptacle 15 between the spaced angle members of the cheese support 16. As shown in FIG. 3, the cheese receptacle 15 is disposed at a lower elevation than the support 16 when the piston 13 is retracted within the housing 12. During the pivoting of the guide rods 11 upon extension of the piston 13, the cheese receptacle 15 is elevated together with the lift element 10 sufficiently to lift the cheeses 7 off the stationary cheese support 16, as can be seen in FIG. 4.

Figure 5A:
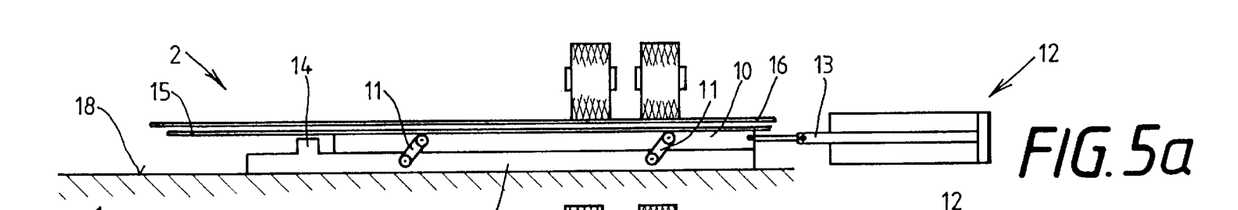
FIGS. 5a through 5e are schematic side elevational views of the transport apparatus similar to FIG. 2 depicting the individual functional positions of the transport apparatus during operation.

The operation of the transport apparatus 2 may thus be understood with reference to FIGS. 5a to 5e. FIG. 5a depicts the initial resting position of the transport apparatus 2, wherein the thrust piston 13 is retracted within its housing 12 and the lift element 10 rests on the thrust element 9. The textile packages to be transported, i.e., the cheeses 7 in the exemplary embodiment, rest on the spaced angle members of the stationary cheese support 16.

Figure 5B:
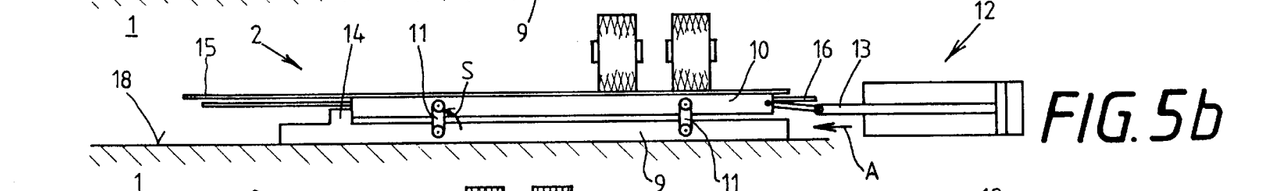

Upon actuation of the thrust piston housing 12, e.g., by application of fluid pressure within the housing behind the piston 13, the piston rod 13 is initially extended as shown in FIG. 5b. As already mentioned above, since a relatively large friction exists between the thrust element 9 and the guide track 18, the guide rods 11 initially pivot in the direction S and in the process displace the lift element 10 in the vertical direction. In the process the V-shaped cheese receptacle 15 disposed on the lift element 10 lifts the cheeses 7 off the stationary cheese support 16. The extent of pivotal movement S of the guide rods 11 is limited, preferably at the point of highest elevation of the lift element 10, by the stop 14.

Figure 5C:
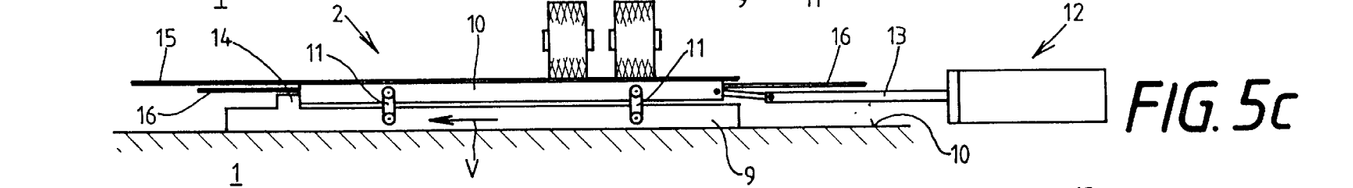

In the course of continuing extension of the thrust piston rod 13, the thrust element 9 overcomes the prevailing friction and is displaced along the guide track 18 in the transport direction V, as represented in FIG. 5c, whereby the lift element 10 is also displaced along with the thrust element 9. Since at this time the cheeses 7 rest on the V-shaped receptacles 15 of the lift element 10, the cheeses 7 are also transported with the lift element 10 in the transport direction V.

Figures 5D, 5E:
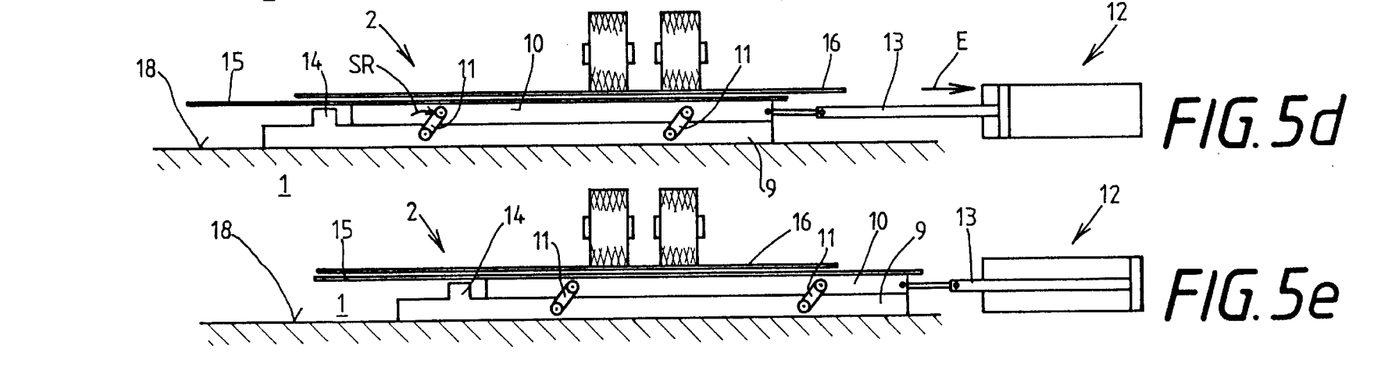

The thrust piston rod 13 is subsequently retracted, as represented in FIG. 5d, and in the process, the guide rods 11 are pivoted back in the direction SR, initially causing the cheeses 7 on the V-shaped cheese receptacles 15 to be placed to rest once again on the stationary cheese support 16 as the thrust piston 13 continues to be retracted. FIG. 5e illustrates the thrust piston 13 after having been completely retracted, the disposition of the components being identical with the initial position of the transport apparatus 2 represented in FIG. 5a excepting only that the cheeses 7 (or other textile packages) have been moved a distance lengthwise along the support 16 corresponding to the stroke of the piston 13. Another package transport cycle can then be started.

FIGS. 6a and 6b, 7a and 7b, and 8a and 8b represent further embodiments of the transport apparatus 2 in accordance with the present invention. As described more fully below, the embodiment of FIGS. 7a and 7b relates to another form of transport apparatus adapted for use in transporting cheeses, and particularly without problems resulting from the spacings between work stations in cheese producing machines wherein the work stations are grouped in several machine sections. The embodiments in FIGS. 6a and 6b and in FIGS. 8a and 8b relate to transport apparatus adapted for use in transporting spinning pots.

Figure 8A:
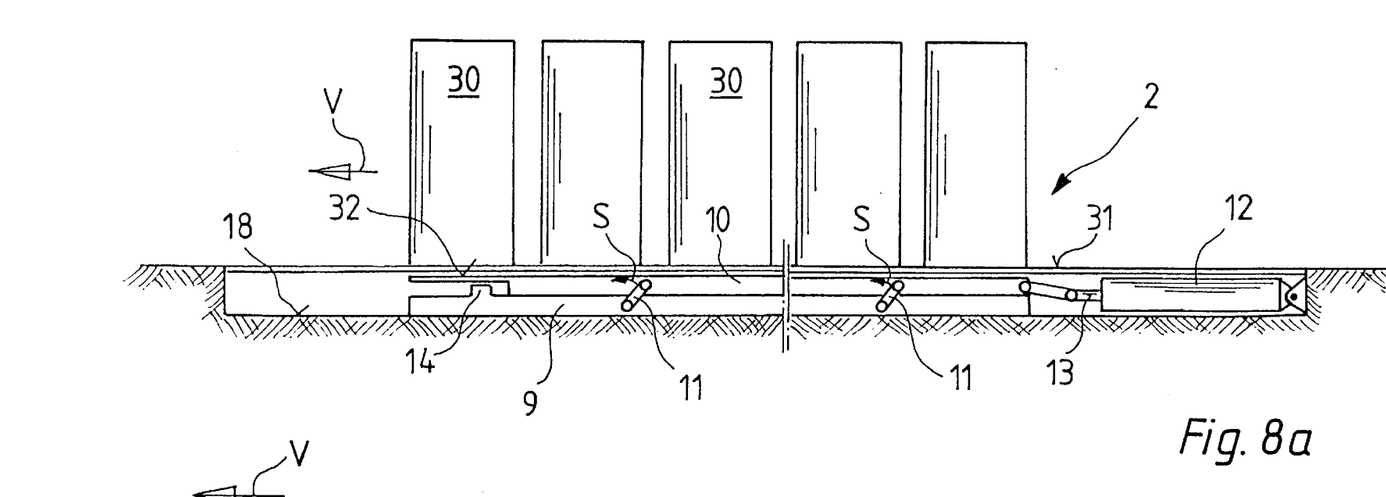
FIGS. 8a and 8b are side elevational views illustrating a fourth preferred embodiment of the transport apparatus of the present invention particularly adapted for transporting spinning cops, depicting the transport apparatus in differing operational positions.
Figure 8B:
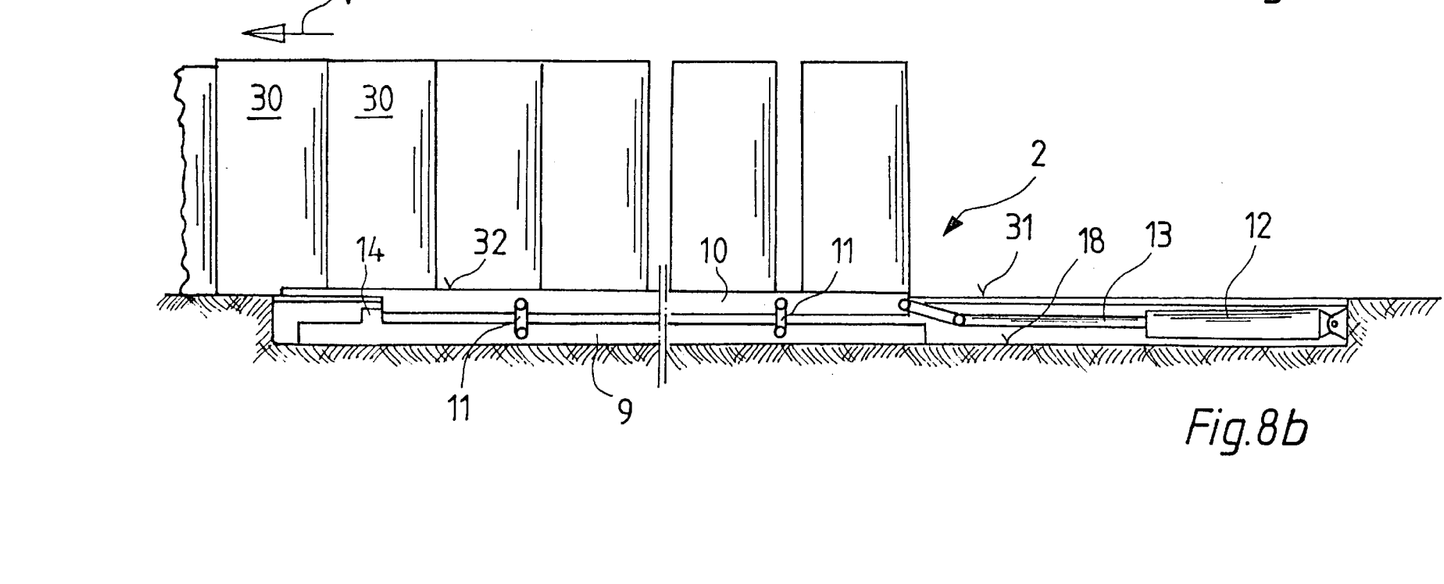

With reference initially to FIGS. 8a and 8b, the transport apparatus 2 is arranged for transporting spinning pots in a defined direction indicated by the directional arrow V. The structure of this transport apparatus 2 is similar to that of the embodiment of FIGS. 1–5e, with corresponding components being indicated by like reference numerals, but this transport apparatus has a pot support surface 31 instead of the cheese support 16 and spinning pot receptacle 32 in place of the cheese receptacle 15 and also is structurally configured of larger dimensions to be more sturdy.

Figure 6A:
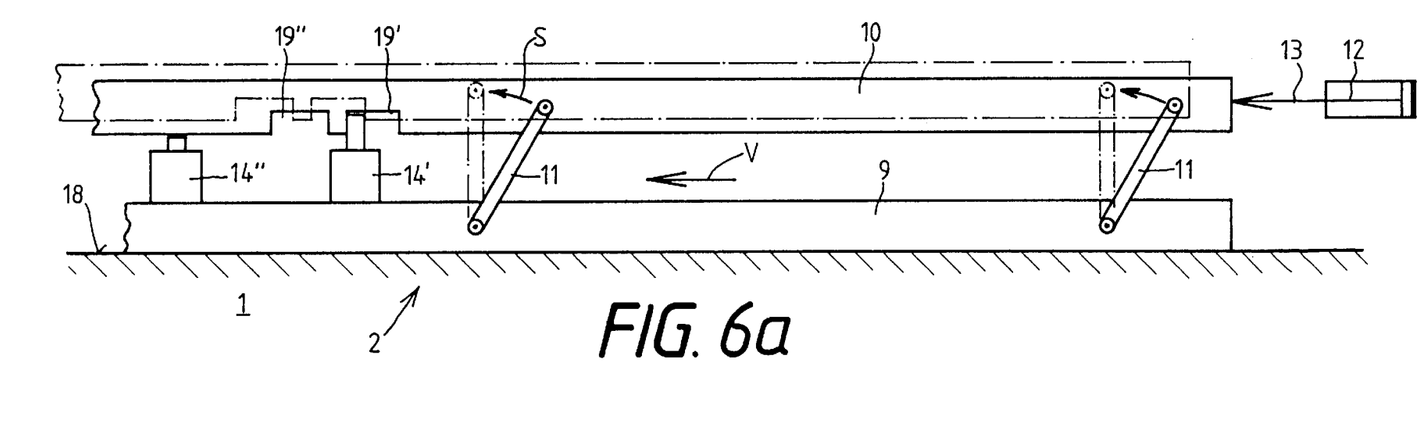
FIGS. 6a and 6b are side elevational views illustrating another preferred embodiment of the transport apparatus of the present invention in differing operational positions.
Figure 6B:
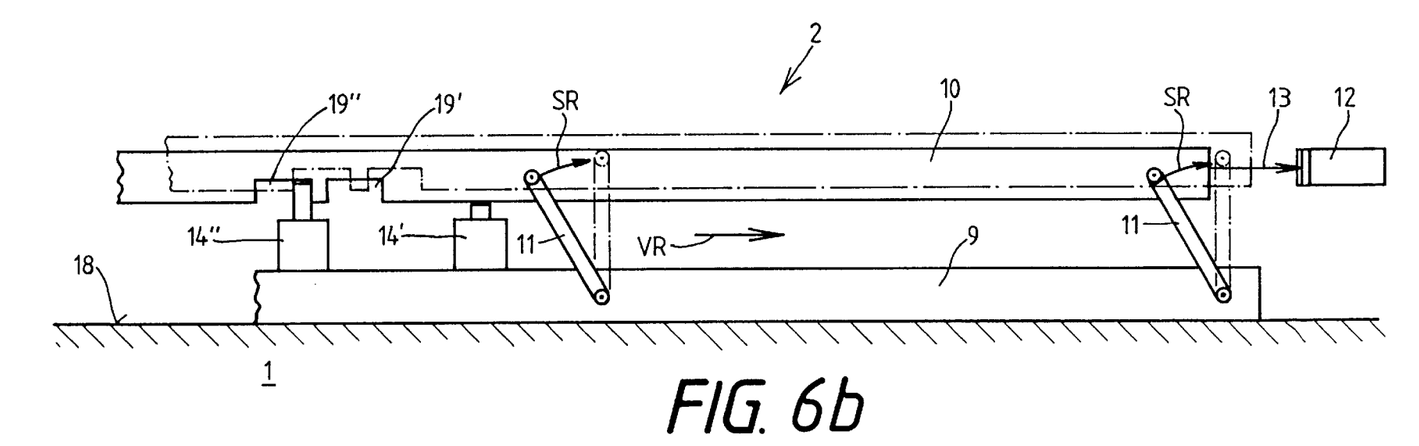

With reference now to FIGS. 6a and 6b, this embodiment of the present transport apparatus 2 is also substantially similar to that of FIGS. 1–5e, with corresponding components being indicated by like reference numerals. In the course of transporting spinning pots (not shown), it can be advantageous, for example, to have the option of selectively changing the package transport direction V or VR. Accordingly, the transport apparatus 2 schematically indicated in FIGS. 6a and 6b is provided with two stop detents 14' and 14" for this purpose, which can be disposed on the thrust element 9 to be selectively extended to cooperate alternatively with corresponding catch recesses 19' or 19" which may be formed in the lift member 10.

Thus, if a spinning pot is to be transported in the transport direction V, as indicated in FIG. 6a, the detent 14' is extended and engages the recess 19', by means of which, as shown in dashed lines, the pivot track S of the guide rods 11 is limited such that further extension of the thrust piston 13 causes a displacement of the spinning pots in the transport direction V. To transport the spinning pots in the opposite transport direction VR, the thrust piston 13 is initially retracted completely and the detent 14" is actuated, as shown in FIG. 6b, and in the process, the detent 14" engages in the recess 19". In the course of the retraction of the thrust piston 13, the guide rods 11 pivot in the direction SR until the detent 14" comes into contact with the rear edge of the recess 19" (as shown in dashed lines). Further retraction of the thrust piston 13 then causes a displacement of the spinning pots in the direction VR.

The embodiments of the transport apparatus 2 described by means of FIGS. 2, 5a–5e, 6a and 6b, and 8a and 8b are arranged such that a uniform, reproducible displacement of all textile packages to be transported and lifted by the lift elements takes place in the course of each transport stroke of the thrust piston 12.

As already mentioned above, textile machines producing cheeses as a rule consist of a plurality of structurally identical machine sections, which in turn have a plurality of work stations at a defined spacing from each other which, for structural reasons, cannot be maintained between adjacent work stations of different sections at the boundaries between adjoining sections. The different spacings between such work stations have been shown to be problematical, particularly in connection with the removal of the cheeses produced in the textile machine.

Figure 7A:
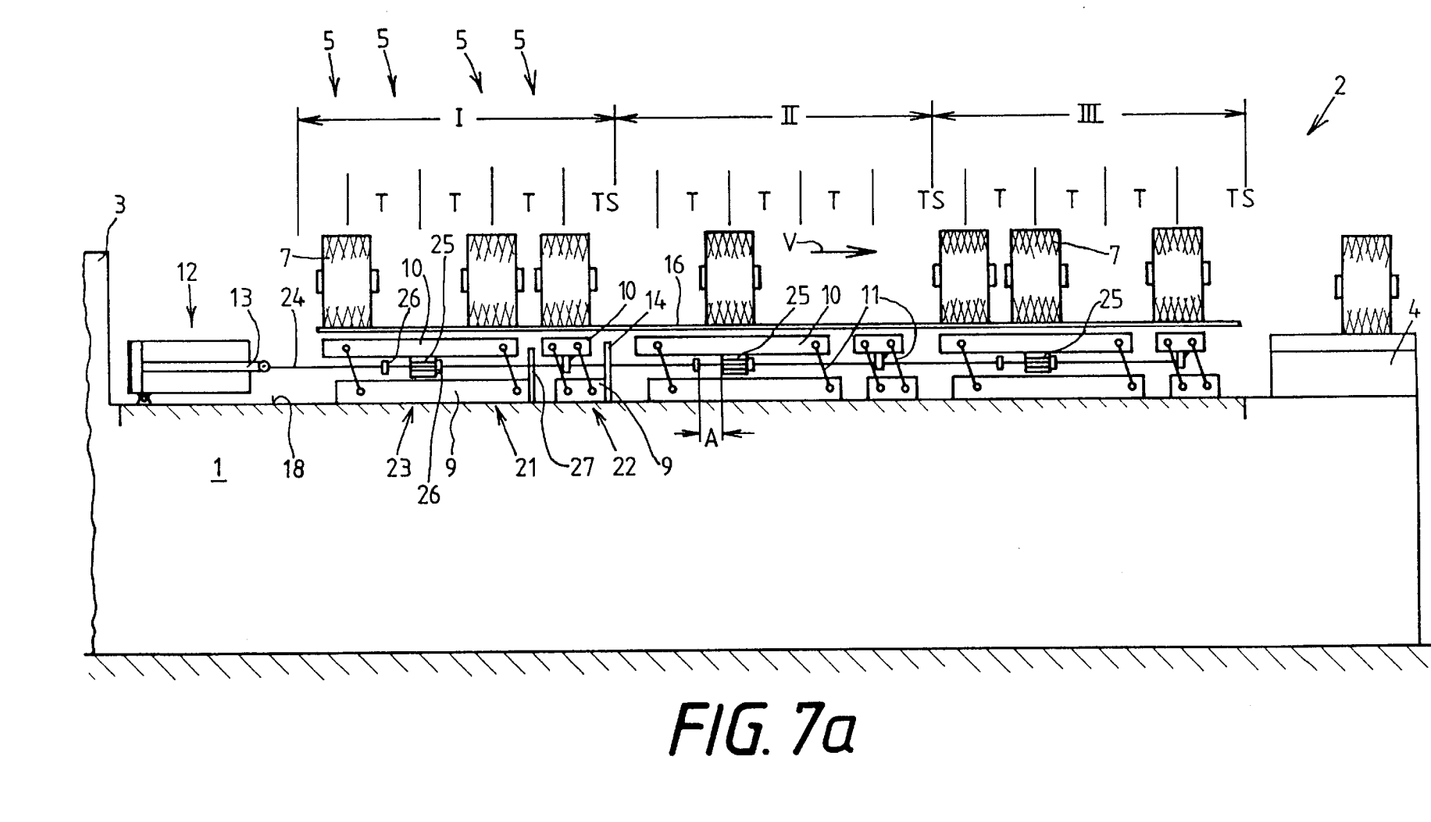
FIGS. 7a and 7b are side elevational views illustrating a third preferred embodiment of the transport apparatus of the present invention in differing operational positions.
Figure 7B:
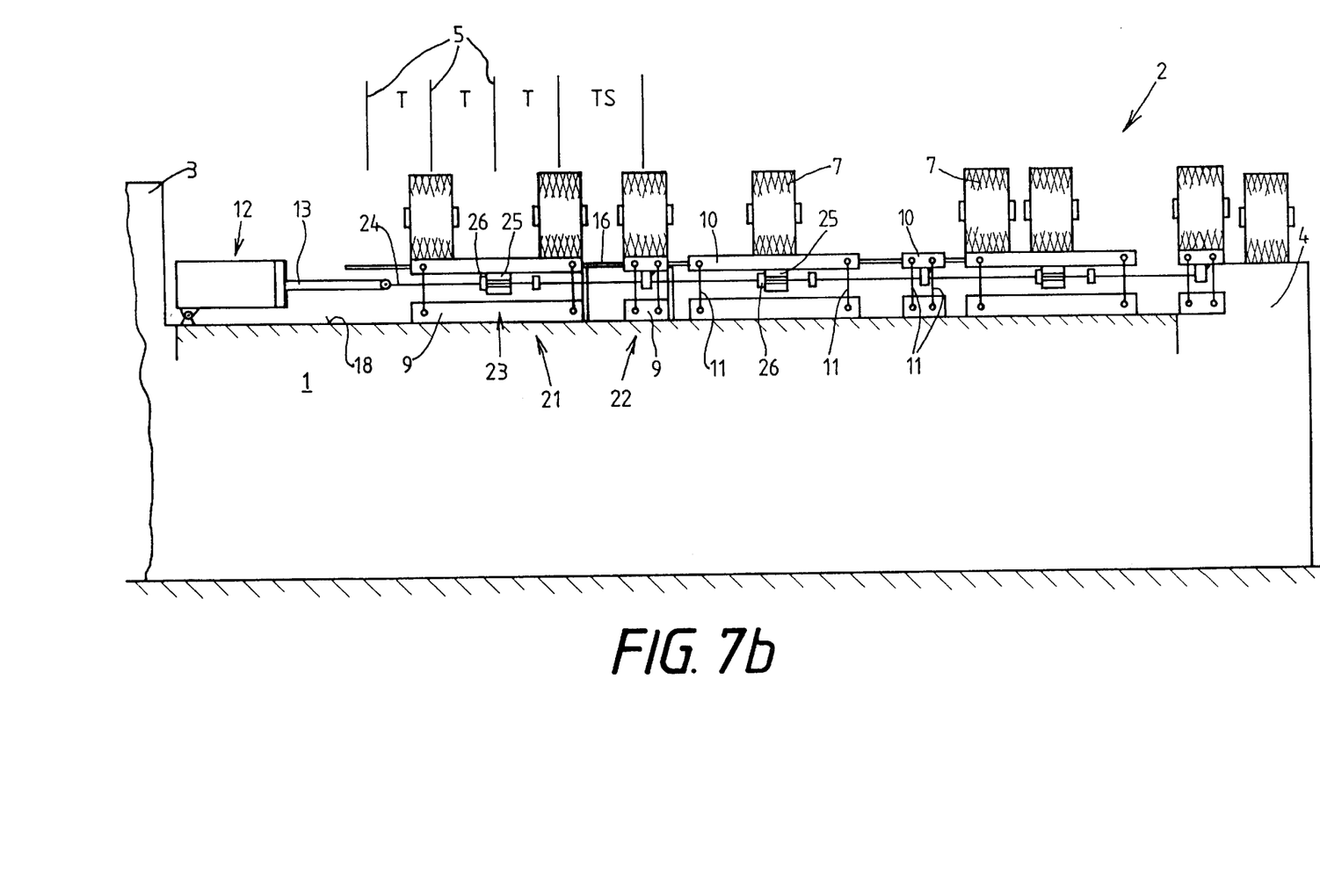

The transport apparatus 2 represented in FIGS. 7a and 7b compensates for such differences spacings between work stations occurring in the area of the machine section boundaries. The textile machine 1, schematically indicated by way of example in the embodiment of FIGS. 7a and 7b, has three machine sections I, II, III, with each individual machine section having four work stations 5. The spacing between the respective work stations 5 within each of sections I, II, III is indicated by T, while the separation between the adjacentmost work stations of different sections in the area of the section boundaries is a greater spacing TS.

Similarly to the previously described embodiments, the transport apparatus 2 in this embodiment has thrust elements 9 and lift elements 10, which are respectively connected to one another by means of guide rods 11. In this case, the transport apparatus 2 is divided into two transport sections 21 and 22 extending the length of each machine section. A push rod 24 extends the length of the machine and is connected endwise to the piston rod 13 of the piston housing 12 to be selectively reciprocated lengthwise of the machine. The transport section 21 for each section of work stations I, II, III is disposed rearwardmost as viewed in the transport direction V and the associated transport section 22 for the respective work station section is disposed in the area of the section boundary with the next adjoining machine section. The lift element 10 of each transport section 22 is fixedly connected with the push rod 24, while the lift element 10 of each transport section 21 is connected with the push rod 24 via a thrust mechanism 23 comprising a connecting element 25 fixed to the associated lift element 9 through which the push rod 24 slides and a dog 26 fixed to the push rod 24 at a predetermined spacing from the connecting element 25 in the retracted position of the piston rod 13.

The transport apparatus thus operates as follows. FIG. 7a shows the transport apparatus 2 in an initial position wherein the thrust piston 13 is retracted and the cheeses 7 lie respectively on the stationary cheese receptacle 16 in the area of the work stations 5. In the course of extending the thrust piston 13, the lift elements 10 of the transport sections 22 fixedly connected with the push rod 24 are initially pivoted upwardly via the associated guide rods 11 until the lift elements 10 abut against respective stops 14 on the associated thrust elements 9 and, in the process, the cheeses 7 above such lift elements 10 are lifted from their resting disposition on the stationary cheese support 16. The raised lift elements 10 of the transport sections 22 are subsequently displaced in the transport direction V by further extension of the thrust piston 13 causing sliding movement of the associated thrust elements 9.

In the course of this displacement, the push rod 24 slides through the connecting elements 25 of each respective thrust mechanism 23 associated with the transport sections until the dogs 26 on the push rod 24, after having moved a distance A, are brought into abutment against the respective connecting elements 25. As the push rod 24 continues its displacement, the lift elements 10 of the transport sections 21 are also pivoted upwardly via the associated guide rods 11, so that the cheeses 7 positioned above these areas along the cheese supports 16 are also lifted upwardly. In the process, the pivoting movement by the lift elements 10 of the transport sections 21 is stopped by means of stops 27 on the associated thrust elements 9, whereby the continued extension of the thrust piston 13 also produces a displacement of the transport sections 21 in the transport direction V. Thus, at the start of the displacement of the transport sections 21, the transport sections 22 already have respectively traveled a transport distance A, which corresponds to the difference in work station spacing at the area of the section boundaries.

In the course of further extension of the thrust piston 13, the transport sections 21 and 22 are displaced together over a distance which corresponds to the spacing T between the work stations within each of the machine sections of the textile machine or a multiple of such spacing T. In this manner, the cheeses 7 on the transport sections 22 are respectively displaced over a total distance TS=T+A, while the cheeses on the transport sections 21 are merely displaced by the distance T.

It will therefore be understood that the several contemplated embodiments in accordance with the present invention each provide a textile package transport apparatus which allows simple and reliable monitoring of the displacement of the cheeses 7 or spinning pots 30 by counting the displacement steps of the transport apparatus. For example, a textile package placed on the transport apparatus at the winding station "17" will be situated directly behind the winding station "45" after twenty-eight displacement steps.

The transport apparatus of the present invention is not limited to the above described exemplary embodiments. The transport apparatus is in principle suited for the gentle transport of textile packages of many different types. For example, it is easily possible to modify the described transport apparatus in such a way that a transport of speed frame bobbins, spinning cops or sliver cans is possible, instead of the transport of spinning pots or cheeses.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In combination, a plurality of textile packages, a textile package handling arrangement having an elongate surface for supporting the textile packages in alignment with one another and defining a transport direction for the textile packages, and an apparatus for transporting the textile packages along the elongate supporting surface comprising a guide track extending in the transport direction beneath the elongate supporting surface, an elongated thrust element supported on the guide track for displacement in the transport direction, an elongated lift element disposed in essentially superposed disposition with respect to the thrust element, means connecting the lift element to the thrust element for elevational movement toward and away from the thrust element in essentially parallel relation thereto, means on the thrust element for limiting the elevational movement of the lift element relative to the thrust element between a lowered position of the lift element disposed beneath the elongate supporting surface and a raised position of the lift element disposed at a higher elevation than the elongate supporting surface wherein the textile packages are displaced by the lift element off the elongate supporting surface to be supported on the lift element, a drive connected to the lift element for actuating elevational movement of the lift element between the lowered position and the raised position and for displacing the lift element and the thrust element as a unit longitudinally along the guide track in the transport direction when the lift element is in the raised position for transporting the textile packages supported on the raised lift element.

2. The combination in accordance with claim 1, wherein the textile package handling arrangement comprises a machine having a plurality of aligned work stations arranged in spaced relation and the drive comprises a thrust piston having an operating stroke corresponding to the spacing between the work stations of the textile machine.

3. The combination in accordance with claim 2, wherein the operating stroke of the thrust piston is matched to the largest spacing between the work stations occurring in the textile machine.

4. The combination in accordance with claim 3, wherein the work stations of the textile machine are arranged in a plurality of sections each having a plurality of spaced work stations and the operating stroke of the thrust piston is matched to a spacing between adjacentmost work stations in adjoining work station sections.

5. The combination in accordance with claim 1, wherein the limiting means comprises a stop element.

6. The combination in accordance with claim 1, wherein the elongate supporting surface and the lift element are configured for receiving and transporting textile yarn cheeses.

7. The combination in accordance with claim 1, wherein the lift element comprises a cheese receiving surface adapted for supporting a plurality of cheeses.

8. The combination in accordance with claim 1, wherein the limiting means comprises switchable stop elements and cooperative catches on the lift element, said switchable stop elements being engagable with said cooperative catches for selective switching between opposing transport directions.

9. The combination in accordance with claim 8, wherein the switchable stop elements are arranged at a spacing from one another on the thrust element and the catches comprise recesses formed at a spacing on the lift element.

10. The combination in accordance with claim 4, and further comprising means for displacing the cheeses within each work station section by differing transport distances.

11. The combination in accordance with claim 10, and further comprising a second thrust element, a second lift element, and a second connecting means supporting the lift element superposed on the thrust element for elevational movement relative thereto between the lowered position and the raised position, the first and second thrust and lift elements being arranged in spaced alignment with one another, the drive comprising an elongate push rod directly fixed to the first lift element and a lost motion connection indirectly connecting the push rod to the second lift element.

12. The combination in accordance with claim 11, wherein the lost motion connection comprises a connecting element fixed to the second lift element and receiving the push rod slidably therethrough and an engagement dog fixed on the push rod at a spacing from the connecting element in the lowered position of the second lift element.

13. The combination in accordance with claim 12, wherein the spacing between the engagement dog and the connecting element is selected to limit the sliding distance of the push rod within the connecting element.

14. The combination in accordance with claim 13, wherein the limited sliding distance of the push rod in the connecting element is selected to correspond to the spacing between adjacentmost work stations in adjoining work station sections.

15. The combination in accordance with claim 1, wherein the elongate supporting surface and the lift element are configured for receiving and transporting textile yarn spinning pots.

16. The combination in accordance with claim 1, wherein the lift element includes a spinning pot supporting surface configured for supporting a plurality of spinning pots.

* * * * *